US009175852B2

(12) United States Patent
Shell

(10) Patent No.: US 9,175,852 B2
(45) Date of Patent: Nov. 3, 2015

(54) EFFICIENT HEAT TRANSFER USING FINS

(76) Inventor: Harvey Duane Shell, Cimarron, NM (US)

( * ) Notice: Subject to any disclaimer, the term of this patent is extended or adjusted under 35 U.S.C. 154(b) by 486 days.

(21) Appl. No.: 13/185,006

(22) Filed: Jul. 18, 2011

(65) Prior Publication Data

US 2012/0012095 A1    Jan. 19, 2012

Related U.S. Application Data

(60) Provisional application No. 61/365,143, filed on Jul. 16, 2010.

(51) Int. Cl.
F23J 11/00 (2006.01)
F23M 9/06 (2006.01)
F23B 80/04 (2006.01)
F28F 9/22 (2006.01)
F28F 13/06 (2006.01)
F28F 1/34 (2006.01)

(52) U.S. Cl.
CPC .................. F23M 9/06 (2013.01); F23B 80/04 (2013.01); F28F 9/22 (2013.01); F28F 13/06 (2013.01); F28F 1/34 (2013.01); F28F 2009/228 (2013.01)

(58) Field of Classification Search
CPC ............. F23J 11/00; F23J 11/02; F23J 11/08; F23J 11/12; F23J 13/00; F23J 15/00; F23J 15/08; F23J 2211/00; F23J 2213/00; F23J 2217/20; F24B 1/185; F24B 5/00; F24B 5/02; F24B 7/005; F23B 80/04; F23M 9/06; F28F 9/22; F28F 13/06; F28F 2009/228; F28F 1/34
USPC ..... 126/312, 99 D, 273.5, 307 R, 307 A, 531; 165/159, 160, 161
See application file for complete search history.

(56) References Cited

U.S. PATENT DOCUMENTS

| 33,591 | A |   | 10/1861 | Layton |  |
|---|---|---|---|---|---|
| 106,985 | A |   | 9/1870 | Baird |  |
| 239,873 | A |   | 4/1881 | Southward |  |
| 241,720 | A |   | 5/1881 | Ricketts |  |
| 395,697 | A |   | 1/1889 | Farmer |  |
| 962,752 | A |   | 6/1910 | Dudgeon |  |
| 1,714,955 | A | * | 5/1929 | Helms | 126/524 |
| 2,396,535 | A |   | 3/1946 | Rumery |  |
| 2,671,440 | A |   | 3/1954 | Dupler |  |
| 3,026,866 | A |   | 3/1962 | Lynch |  |
| 4,037,582 | A |   | 7/1977 | Moody |  |
| 4,276,870 | A |   | 7/1981 | Heard, Jr. |  |
| 4,287,875 | A |   | 9/1981 | Mayes |  |
| 4,320,740 | A |   | 3/1982 | Lassy et al. |  |
| 4,363,785 | A |   | 12/1982 | Willson |  |
| 4,426,937 | A |   | 1/1984 | Sietmann et al. |  |
| 4,561,420 | A |   | 12/1985 | Thomsen |  |
| 4,878,478 | A |   | 11/1989 | Johnson |  |
| 4,886,047 | A |   | 12/1989 | Bonin |  |
| 5,129,312 | A |   | 7/1992 | Berger |  |
| 5,566,607 | A | * | 10/1996 | Schleimer | 99/446 |
| 2004/0007229 | A1 |   | 1/2004 | Sproul |  |
| 2009/0218359 | A1 |   | 9/2009 | Repetti, III |  |

FOREIGN PATENT DOCUMENTS

GB      637271    *  5/1950

* cited by examiner

Primary Examiner — Alfred Basichas
(74) Attorney, Agent, or Firm — Justin R. Jackson; Jeffrey D. Myers; Peacock Myers, P.C.

(57) ABSTRACT

A method, system, and apparatus for capturing heat wherein one or more fins are arranged such that hot air is trapped by the fins and must descend below at least one of the fins in order to exit through an outlet.

22 Claims, 13 Drawing Sheets

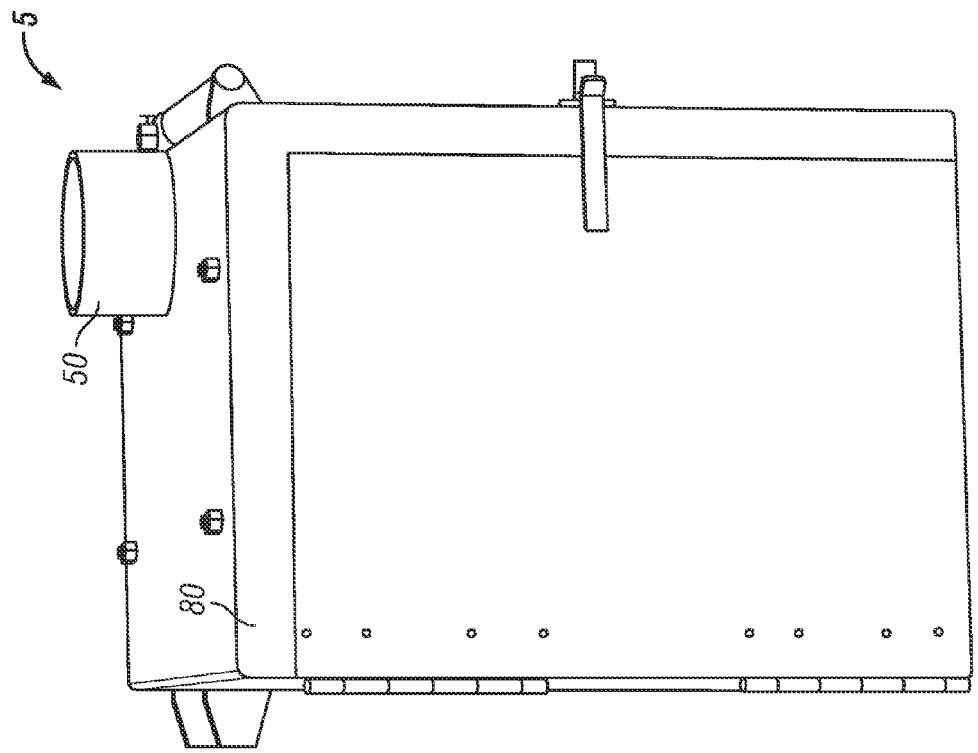
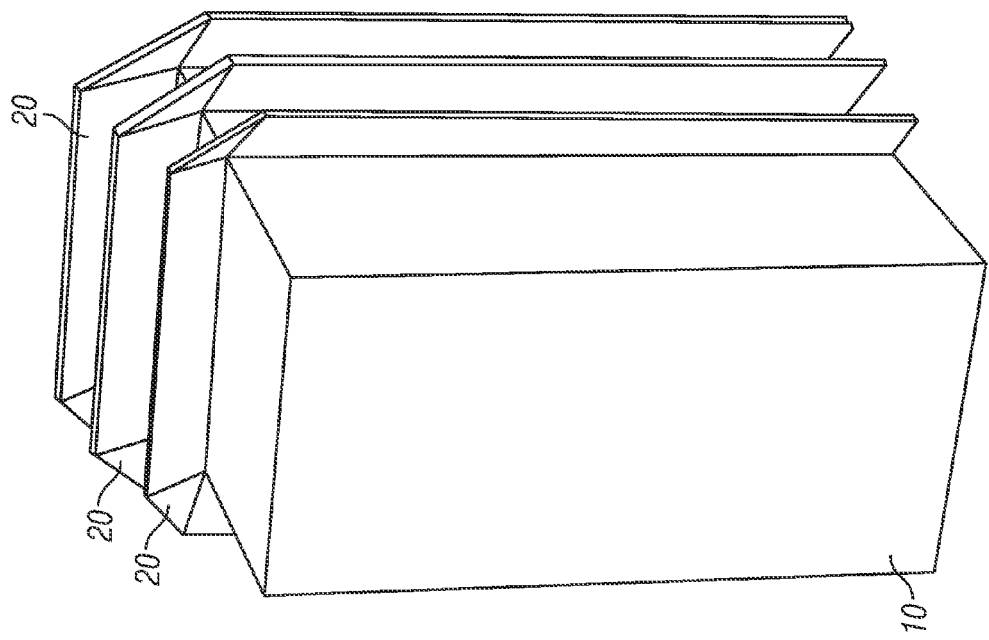

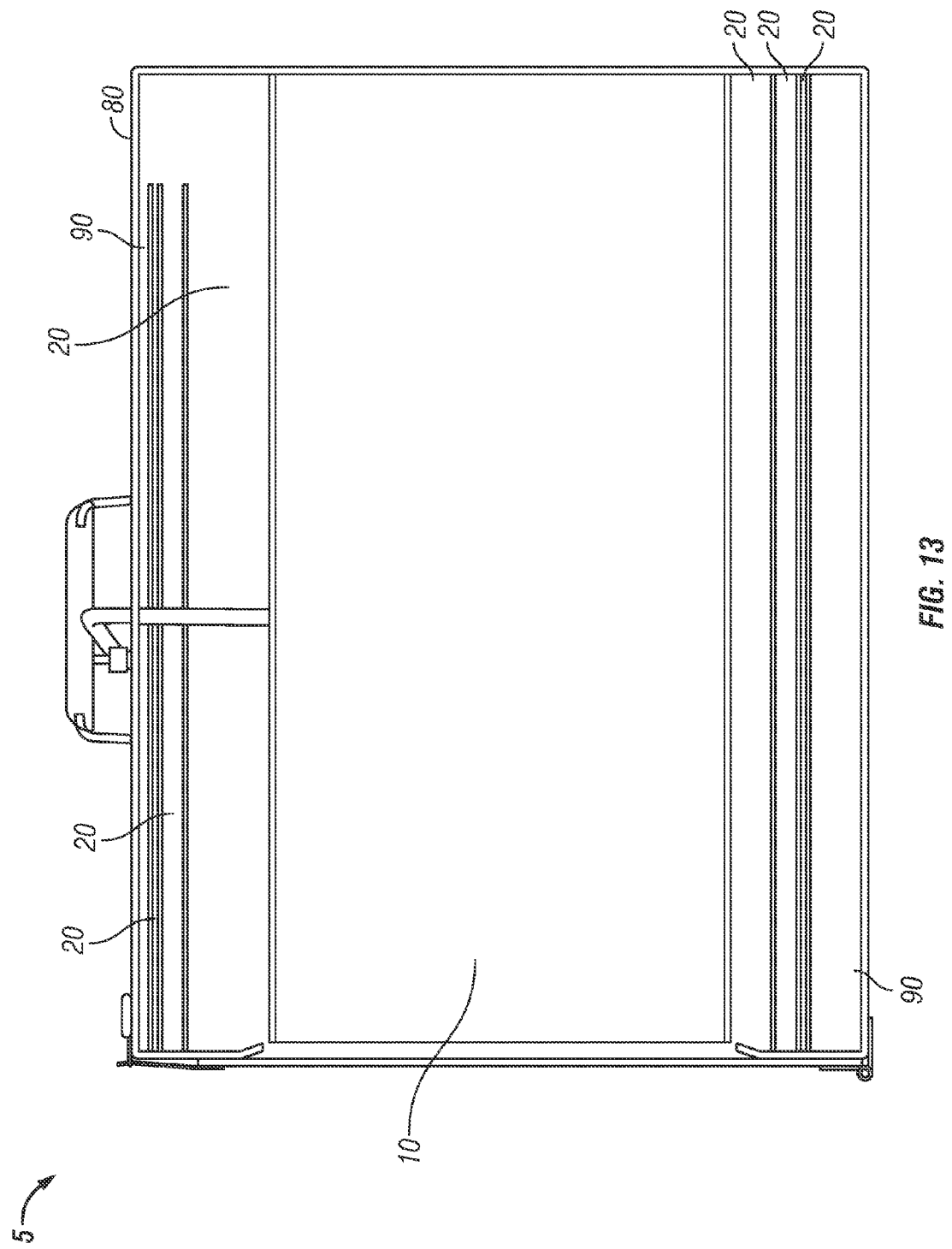

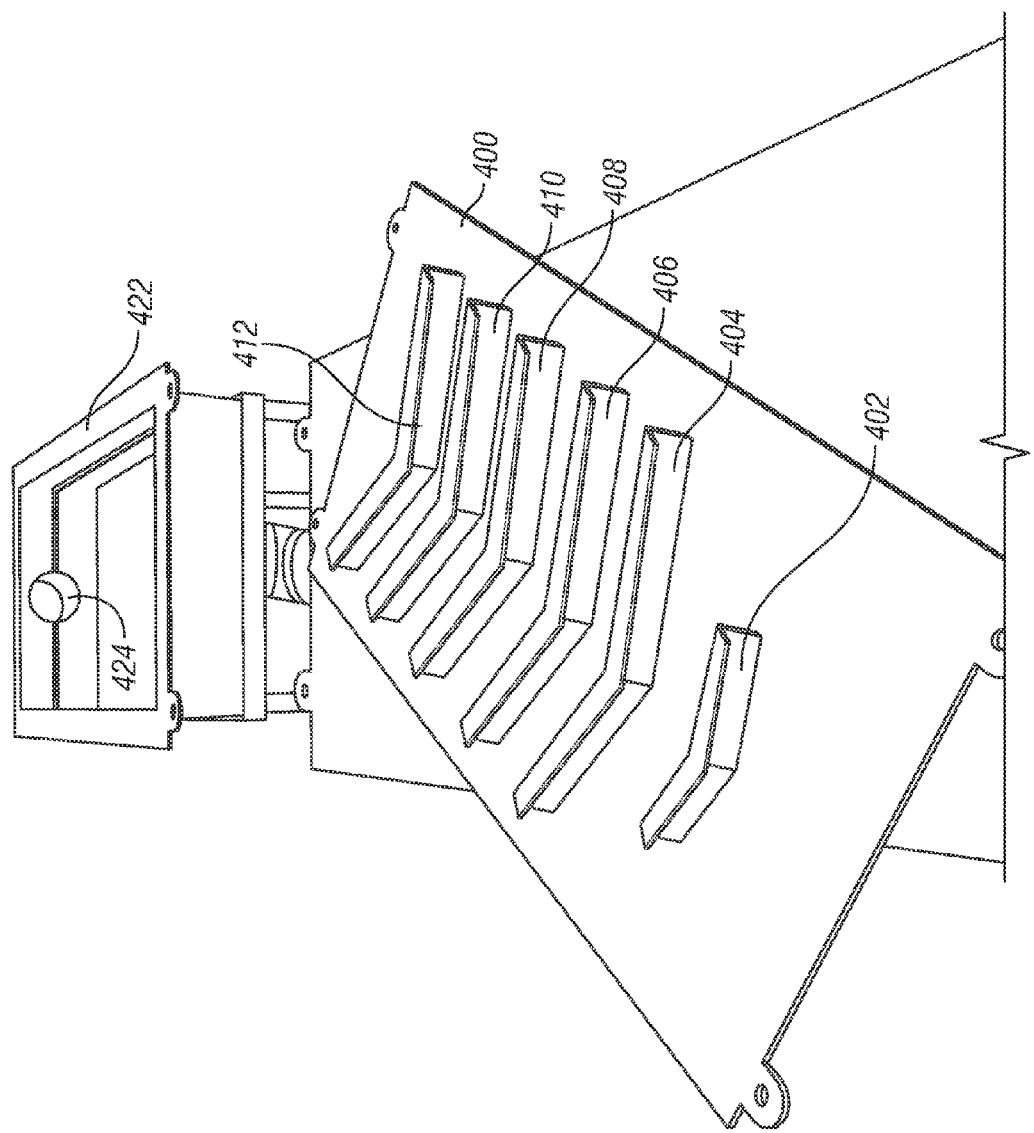

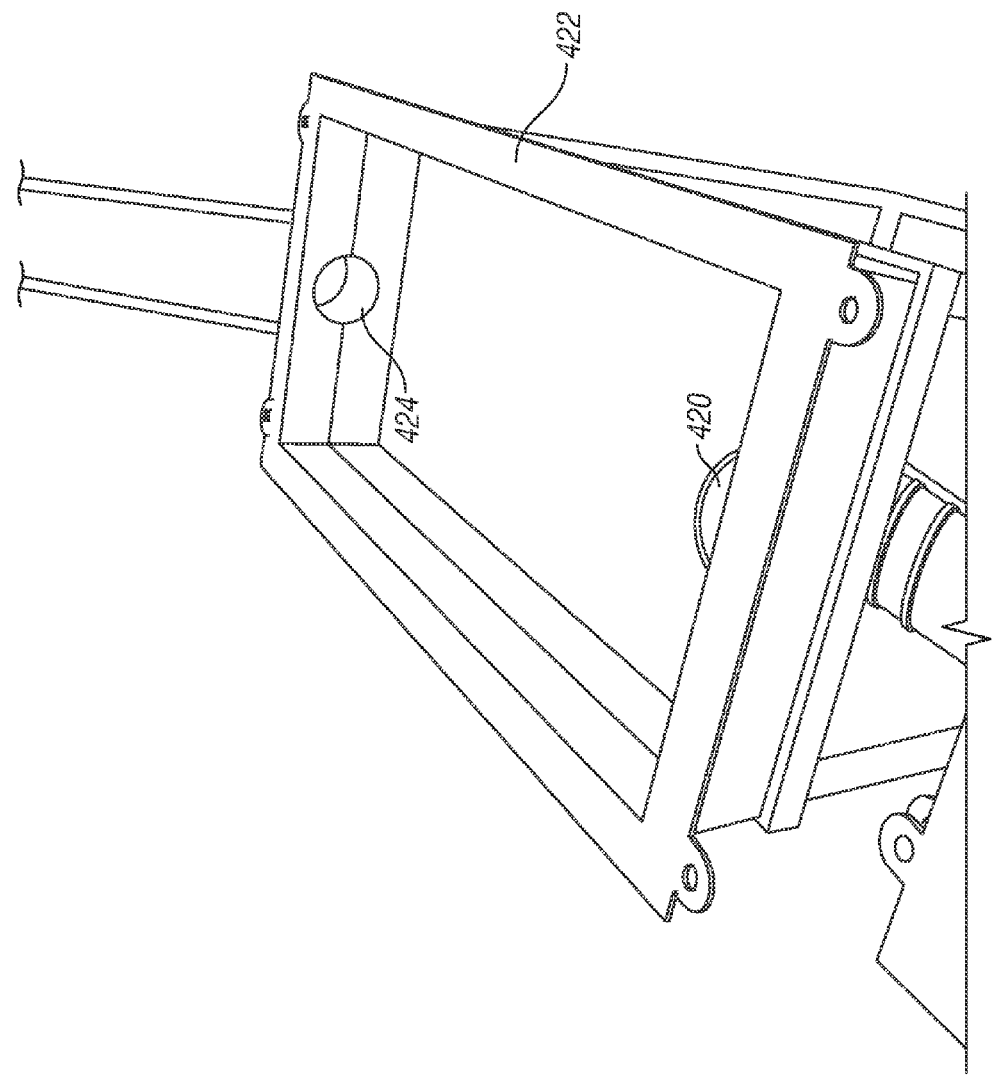

EFFICIENT HEAT TRANSFER USING FINS

CROSS-REFERENCE TO RELATED APPLICATIONS

This application claims priority to and the benefit of the filing of U.S. Provisional Patent Application Ser. No. 61/365,143, to Harvey Duane Shell, entitled "Methods and Apparatuses for Capturing Heat", filed on Jul. 16, 2010, and the specification thereof is incorporated herein by reference.

BACKGROUND OF THE INVENTION

1. Field of the Invention (Technical Field)

Embodiments of the present invention relate to methods, systems, and apparatuses for capturing and/or directing heat. Embodiments of the present invention are particularly useful for devices such as ovens, stoves, furnaces, heaters and/or fireplaces.

2. Background

Known stoves, heaters, ovens and the like typically allow heat to flow from the heat source and escape out through a chimney with little and/or no restriction to the flow of the heated air. Some known devices employ metal fins which causes the heated air to flow back and forth in a pattern around the fins. Known systems, however, do not employ fins which slope downward and which are sealed at their upper end. Such known systems thus permit the heated air to be partially directed by the fins, but permit the heated and rising air to easily continue to rise and exit out of the chimney.

For heaters, stoves, and the like, heat which exits out of the chimney is wasted and thus reduces the efficiency of the firebox. Known systems which employ fins and baffles attempt to increase the surface area of contact with the heated air in an attempt to permit more conduction of heat from the inside of the firebox to the outside of the firebox. Such systems, however, do not actually trap the rising heated air against the side of the firebox as is taught by the present invention. There is thus a present need for a method and apparatus which increases the efficiency of ovens, stoves, furnaces, heaters, fireplaces and the like.

U.S. Pat. No. 5,129,312, to Berger, teaches a radiant baffle assembly. That assembly, however, does not provide downwardly-depending fins. Accordingly, Berger is not capable of trapping rising hot air such that the hot air must cool and descend before it can exit through a chimney.

U.S. Pat. No. 241,720 to Ricketts teaches a fireplace which has a plurality of deflectors. However, Rickets teaches that the deflectors are arranged such that at least some of the hot air from the fireplace can rise past the front of the fireplace and exit through a chimney without ever encountering any deflectors. Further, Rickets places the deflectors at the back of the fireplace and puts the chimney directly above them. In this configuration, any additional heat that may be absorbed due to the deflectors simply heats the air on the back side of the radiator and air then rises and is lost through the chimney. Accordingly, Ricketts deflectors do not increase the heat transfer of the fireplace and thus reduces the temperature of the exhaust gas that exits the fireplace.

BRIEF SUMMARY OF EMBODIMENTS OF THE PRESENT INVENTION

An embodiment of the present invention relates to an apparatus that includes a firebox; a plurality of fins, that are positioned at an angle of at least 45 degrees with respect to a horizontal axis and the fins are arranged such that rising hot air from the firebox is trapped thereby; a primary exhaust outlet positioned such that the hot air trapped by the fins must descend below at least one of the fins in order to travel to the primary exhaust outlet, the primary exhaust outlet arranged such that no hot air from the firebox can travel up and exit therethrough without first encountering at least one of the fins.

Optionally, the fins can be positioned at an angle of at least 60 degrees with respect to a horizontal axis, or they can be positioned at least substantially vertical. The apparatus can also include a fin-containing chamber, which can optionally include a plurality of fins disposed within it. The firebox can be in fluid communication with the fin-containing chamber. The fin-containing chamber can be in fluid communication with the primary exhaust outlet. The plurality of fins can include five or more fins. Optionally the plurality of fins which are disposed within the fin-containing chamber can be at least substantially sealed along their entire length against a top surface of the fin-containing chamber.

In one embodiment, the plurality of fins can have no openings in an upper portion thereof; or they can have openings which total less than 10% of each fin's surface area. In one embodiment, the fins are not curved.

An embodiment of the present invention also relates to an apparatus that includes a firebox; a fin-containing compartment; and a plurality of fins, the fins depending at an angle of at least 45 degrees with respect to a horizontal axis, the fins disposed within the fin-containing compartment, the fins arranged such that hot air from the firebox rises up between the fins and transfers at least some of its heat energy to the fin-containing compartment, the fin-containing compartment heating via conduction a usable environment. The apparatus can also include an exhaust outlet. The fins and the exhaust outlet can be positioned such that hot air which rises up between the fins must descend below at least one of the fins in order to exit through the exhaust outlet.

An embodiment of the present invention relates to an apparatus that includes a fin-containing compartment, an exterior of the fin-containing compartment in fluid communication with a usable environment; a hot air entrance disposed within the fin-containing compartment; an exhaust outlet disposed within the fin-containing compartment; and a plurality of fins arranged within the fin-containing compartment. Optionally, the fin-containing compartment can be formed at least partially from a thermally-conductive material. In one embodiment, the usable environment is a living space and/or a cooking chamber. Optionally, the cooking chamber can be formed at least substantially from the fin-containing compartment.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIGS. 1-5 illustrate rear, perspective side, front, top, and perspective bottom views respectively of an embodiment of a firebox according to the present invention;

FIGS. 6-10 illustrate front (with door closed), left side, rear, right side, and top views respectively of an embodiment of a stove comprising the firebox of FIGS. 1-5;

FIG. 13 illustrates a bottom view of the stove of FIG. 6;

FIGS. 18A and B are drawings which illustrated components of a fin-containing chamber according to an embodiment of the present invention.

DETAILED DESCRIPTION OF THE INVENTION

Figure 2:
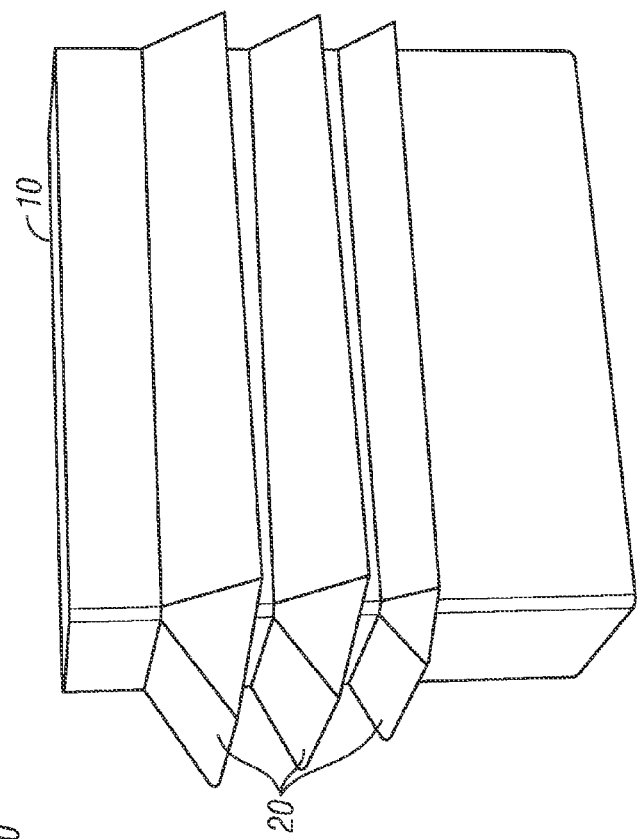
Figure 1:
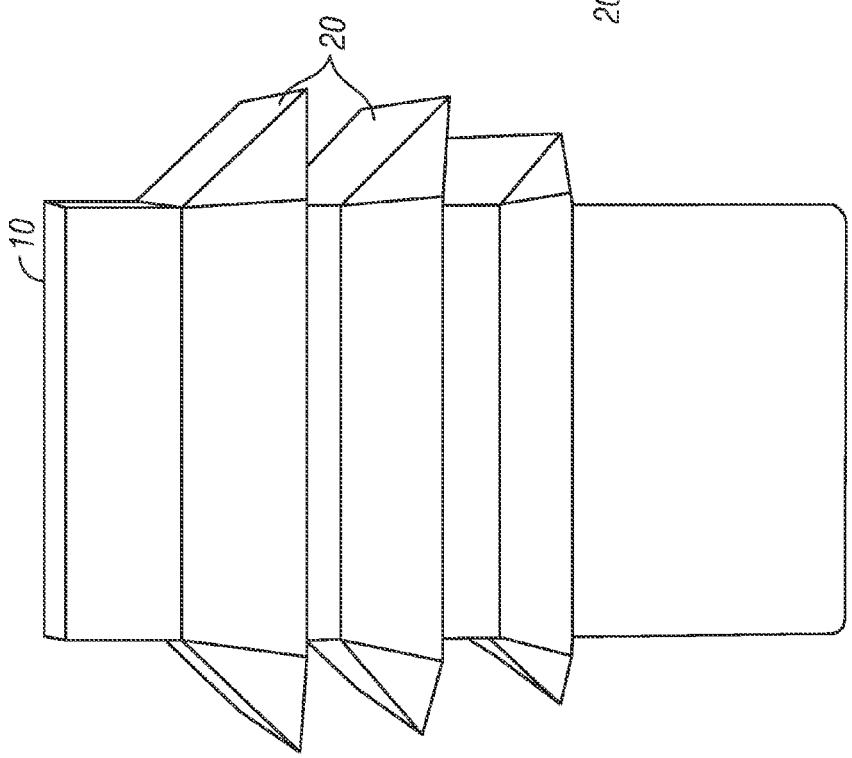
Figure 4:
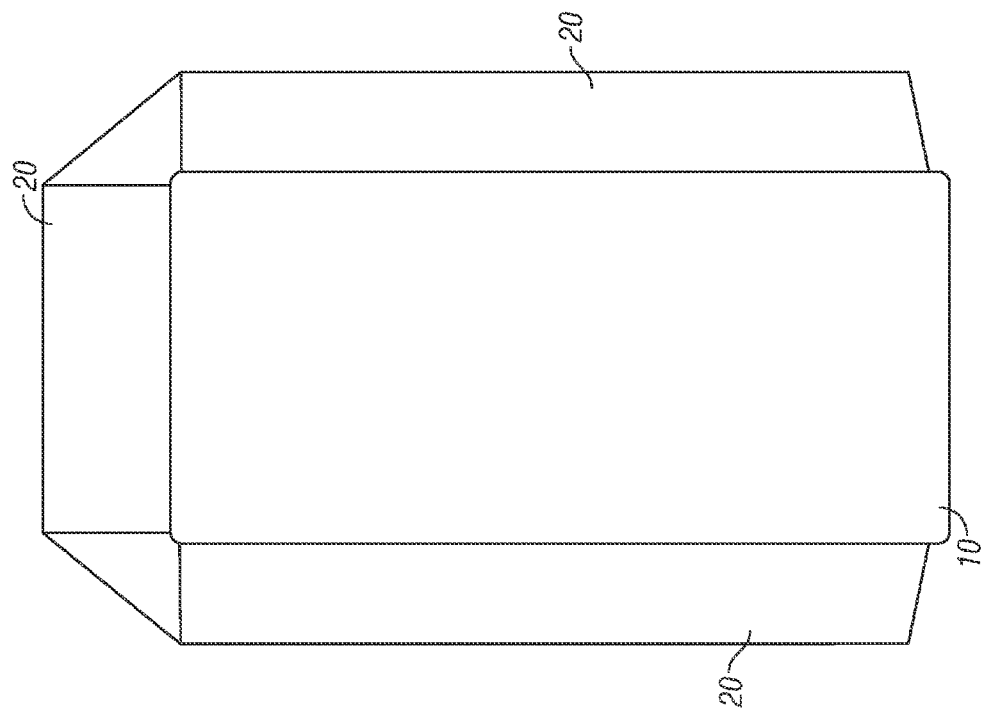
Figure 3:
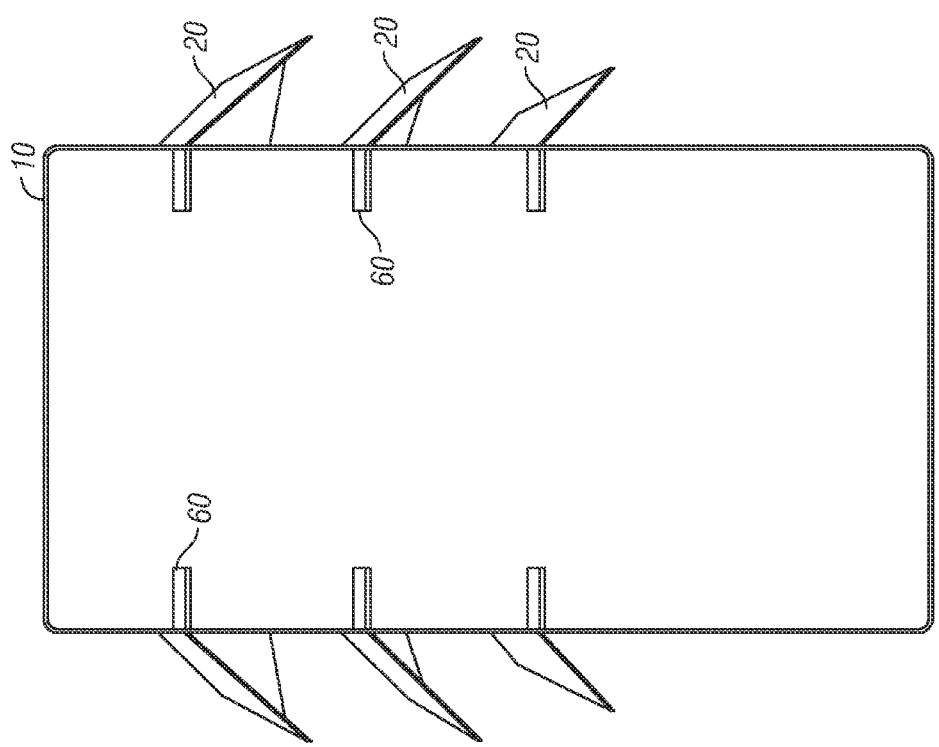
Figure 8:
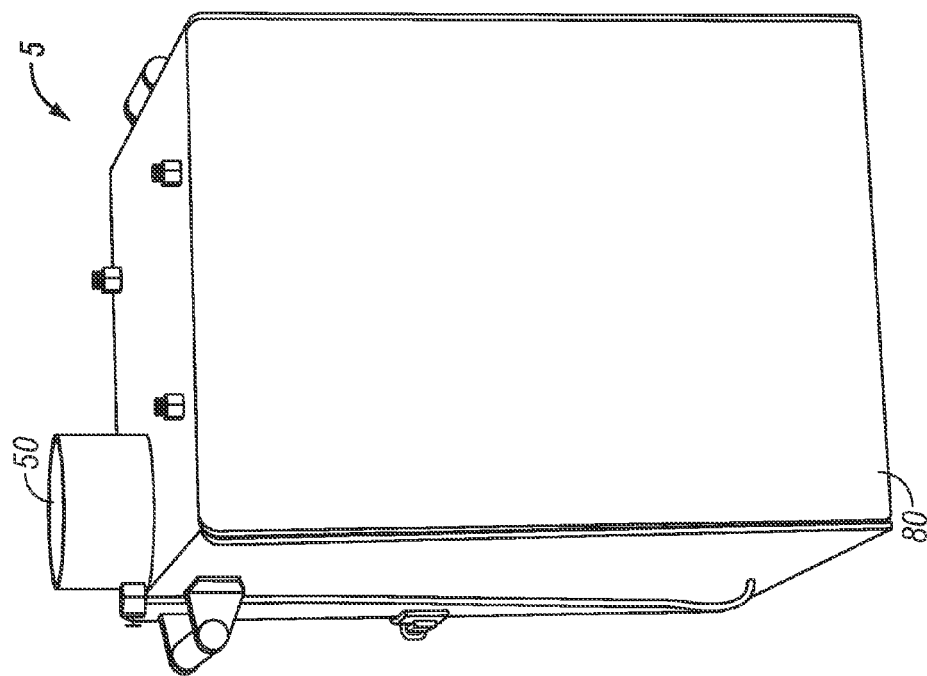
Figure 7:
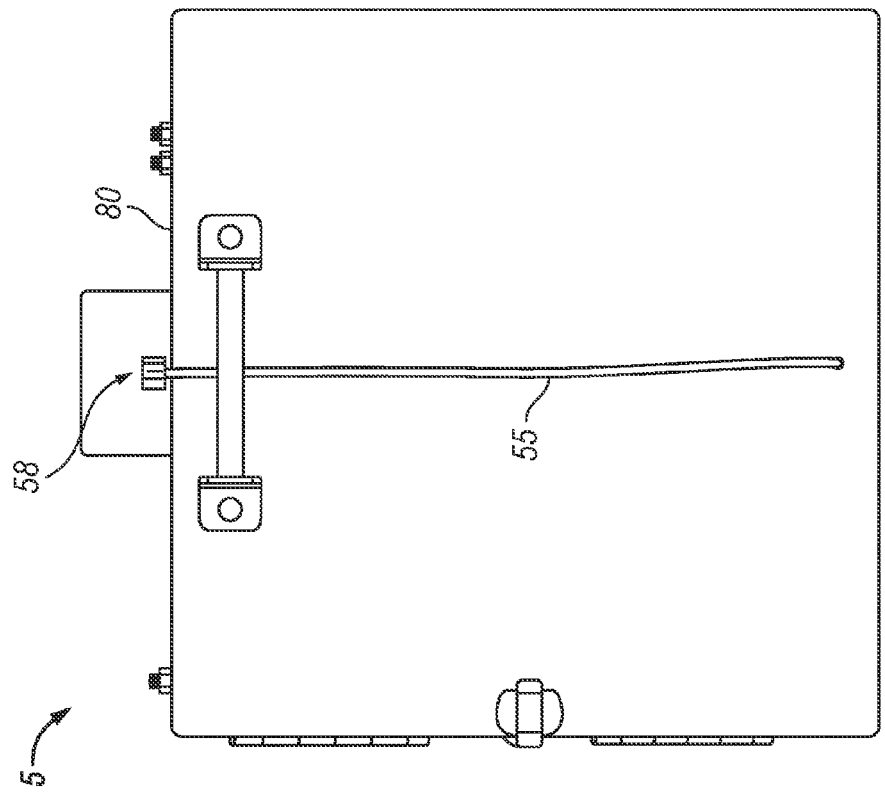
Figure 10:
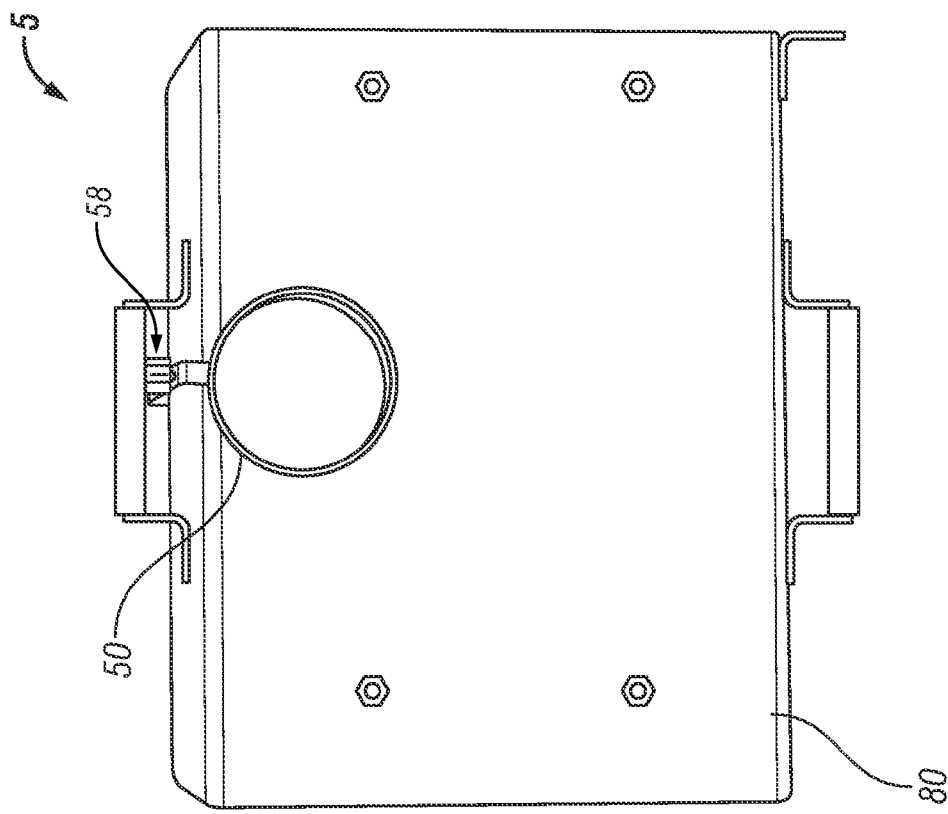
Figure 9:
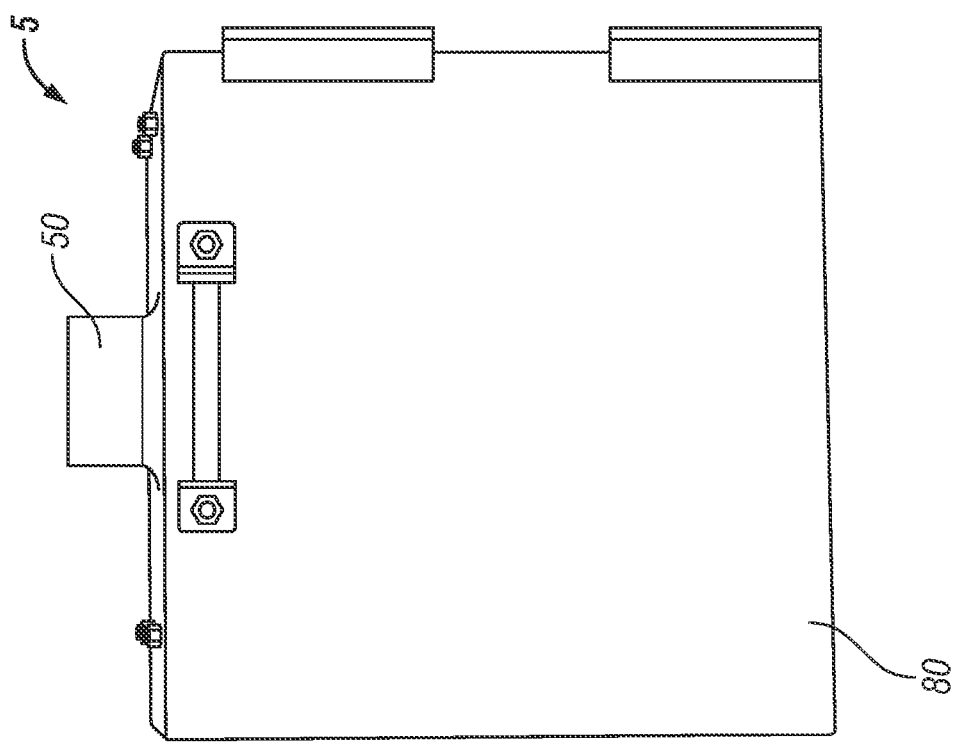
Figure 12:
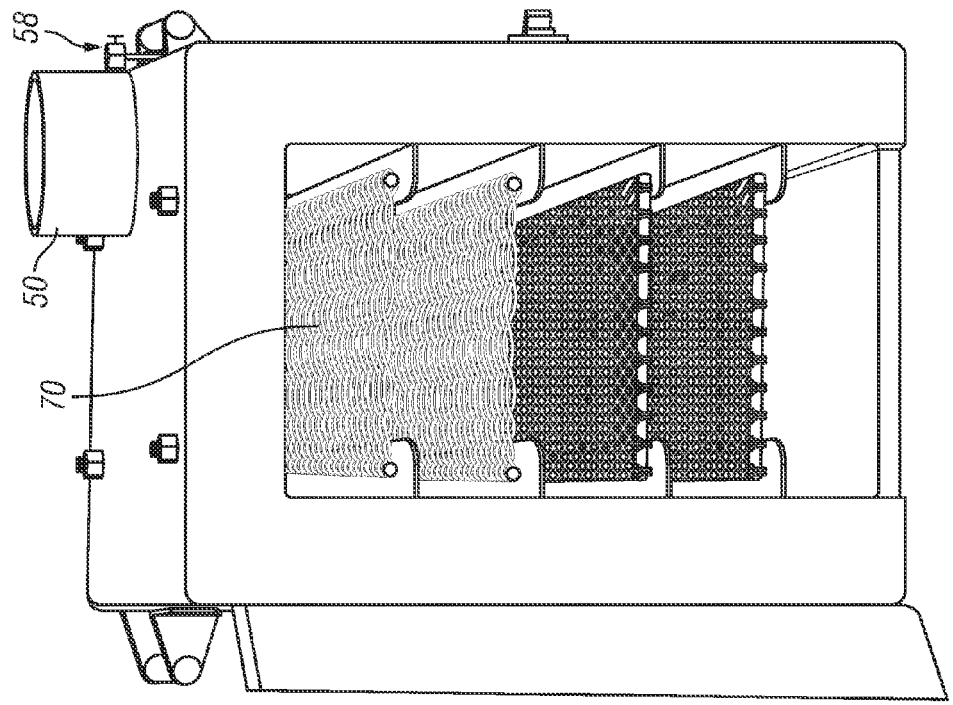
FIG. 12 illustrates a front view of the stove of FIG. 6 with the door open and shelves installed.
Figure 11:
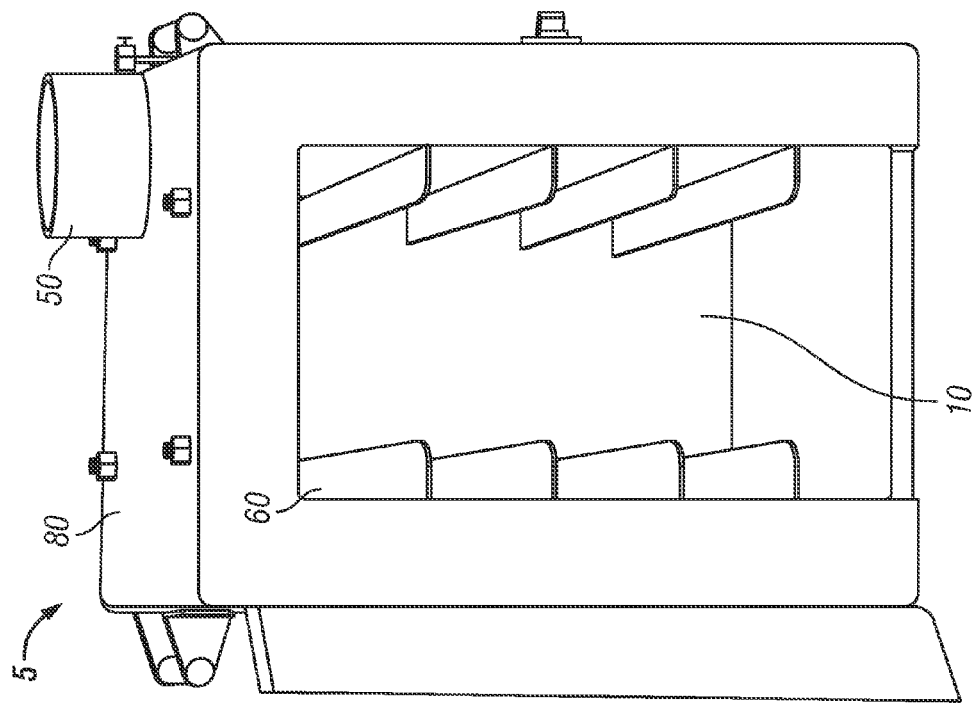
FIG. 11 illustrates a front view of the stove of FIG. 6 with the door open.

Embodiments of the present invention relate to apparatuses and methods for directing and concentrating heat in an oven, stove, grill, firebox, fireplace or the like by the use of a plurality of conductive fins, most preferably metal fins, which inhibit heat from escaping through the chimney of the heating enclosure.

As used throughout the specification and claims, the term "firebox" is intended to mean a heat-containing enclosure and can include, but is not limited to, fireplaces, stoves, heating units, heat-transfer units, combinations thereof, and the like. The term firebox can be powered from any type of heating source, including but not limited to, exothermic reactions—such as burning fuel sources, electrically-powered heating sources, solar-powered heating sources, combinations thereof, and the like. The terms "primary exhaust outlet" and/or "exhaust outlet" include exhaust outlets such as chimneys, flues, smokestacks, and other similar structures of combustion-related heat sources, as well as hot air outlets which are associated with non-combustion heat sources.

Although this application refers to "heated air" and/or "hot air", which is emitted from a heat source, these terms are intended to also include any heated matter, including byproducts of combustion. As used through the specification and claims, the term "usable environment" is intended to mean any environment wherein a heating effect is desired. Further, the term "usable environment" specifically excludes a fireplace or other exhaust-gas outlet.

FIGS. 1-13 illustrate various views of an embodiment of fin-containing chamber 5 according to embodiments of the present invention. In this embodiment, fin-containing chamber 5 is preferably formed into a cooking chamber and preferably includes inner chamber 10, where food or another item that is desired to be heated is placed, a plurality of fins 20 are attached thereto, and outer shell 80 surrounds inner chamber 10. In use, heated air is preferably applied beneath fin-containing chamber 5 and the heated air is directed up between inner chamber 10 and outer shell 80 wherein the heated air is entrapped, at least temporarily, by fins 20. Fins 20 preferably angle downward at least at a terminal edge thereof, which fins 20 are preferably attached to the outside of inner chamber 10, preferably with each fin being greater in size than the fins below it. Each fin preferably extends along the entire length of the side of inner chamber 10 that it is attached to, although desirable results can be obtained by each or some of the fins extending only part of the length of inner chamber 10. Inner chamber 10 optionally comprises shelf supports 60 for supporting shelves 70. As illustrated in FIGS. 10-13, inner chamber 10 and shell 80 preferably form a modified convection stove. In a first embodiment, wherein heat is directed to an inner chamber 10 via one or more fins, heated air is drawn from the bottom of the stove through gap 90 between inner chamber 10 and shell 80. In a typical convection stove, heated air easily escapes through a chimney disposed at an upper end thereof. While a chimney can optionally be provided on an upper end of shell 80, such chimney is not actually necessary since it would permit heat to escape from fin-containing chamber 5. While such an arrangement may be advantageous in very limited circumstances, such as when the air is also to be used to heat other areas in a house, such as an upstairs area, the efficiency of the stove is reduced.

Optionally, water holding container 50 can be disposed on shell 80 and water line 55 can optionally extend from container 50 into inner chamber 10. In this embodiment, a user can elect to create steam within inner chamber simply by opening valve 58.

In an embodiment of the present stove, fins 20 inhibit the convection of the heated air; as the hot air rises, it is forced against the side of inner chamber 10, where its heat is conducted therein, thus increasing heat delivered to the interior of inner chamber 10 and increasing the efficiency of the stove. In one embodiment, fins 20 that are disposed down low preferably project a shorter distance than those fins that are higher. For example, a middle row of fins preferably extends farther out of the side of inner chamber 10 than a bottom row of fins. A top row of fins preferably extends farther out of the side of inner chamber 10 than both a middle row and a lower row of fins, such that higher-positioned fins are progressively larger. In one embodiment, shell 80 is preferably sized to be just slightly larger than the topmost fin. In this embodiment, heated air, which rises past the top fin is preferably trapped within a hollow void above the top fin such that the hot air cannot escape. Optionally, the void above the top fin is at least substantially sealed to prevent hot air from escaping therefrom. In one embodiment, no hot air outlet is provided at the top of shell 80.

Even though the movement of heated air is inhibited, because fins 20 trap the heated air against inner chamber 10, shell 80 still remains much cooler than the temperature of inner chamber 10.

Figure 14:
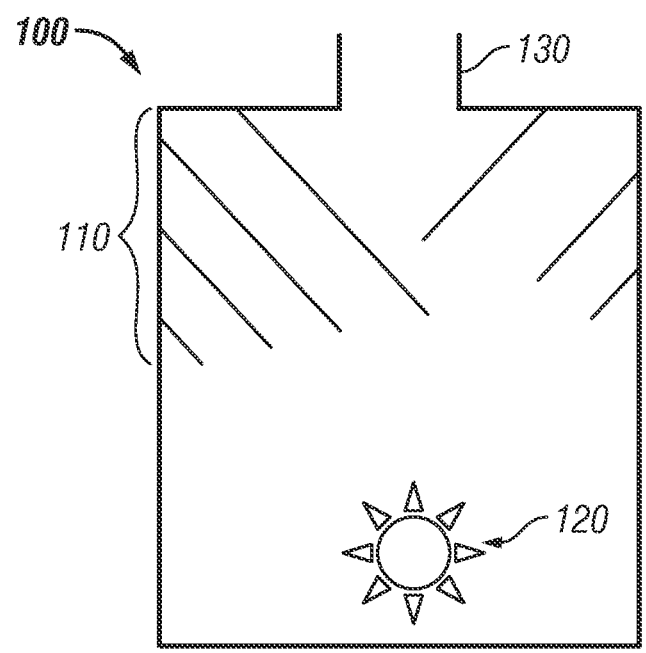
FIG. 14 is a drawing which schematically illustrates an embodiment of the present invention wherein a plurality of fins is disposed within a firebox.

Another embodiment of the present invention works in an opposite manner under the same principal as that previously discussed. In this embodiment, instead of heat being directed into an inner chamber with fins, heat is instead directed to an outside of an outer shell with fins. This embodiment preferably comprises a firebox comprising a chimney without an external shell. In this embodiment, fuel is burned within the firebox and the heat produced is directed toward outer walls of the firebox, thereby increasing the heating effect of the firebox and causing the exhaust temperature from a fireplace to be lower than would be the case without the use of the fins. As illustrated in FIG. 14, firebox 100 preferably comprises a plurality of angled fins 110, which preferably overlap, thus inhibiting the escape of heated air created by combustion source 120 through chimney 130. The heated air is temporarily trapped within firebox 100, thereby increasing the temperature and thus the radiant and conducted heat provided by firebox 100, in addition to increasing combustion efficiency.

Of course, fins which slope downward and are attached at their top portion can provide desirable results in accordance with the teachings of the present application when introduced into existing structures. For example, the efficiency of conventional hot water heaters can be greatly increased simply by introducing sloped fins within the column of rising hot air such that the hot air is forced against and thus at least temporarily trapped against the heat conduction portion of the water heater which directly heats the water contained therein. Further, the ability to greatly increase the rate of heat transfer from a fuel source can also provide desirable results with camping and survival equipment. For example, the embodiment of FIGS. 1-13 can be used to cook food over an open fire. Of course, one or more legs or a separate stand can also be provided which suspends firebox 5 directly above a heat source.

In one embodiment, the sloped fins are sealed at the top such that the rising heated air is trapped and is not provided with an outlet at the upper portion of the fins. In an alternative embodiment, the fins can be non-sloped and are substantially vertical. As in the other embodiments, it is most preferable that an opening not be provided at the upper end of the fins such that the heated air is not provided with a path to simply flow through. In each of the preceding embodiments, although a path is preferably not provided at the top of the fins, desirable results can still be achieved by providing a small path through which some of the heated gases can escape.

In one embodiment, the sloped fins of the present invention are flat and are not curved, such that the rising heated air is not provided a curved path that permits the heated air to simply roll off of the fin.

Figure 15A:
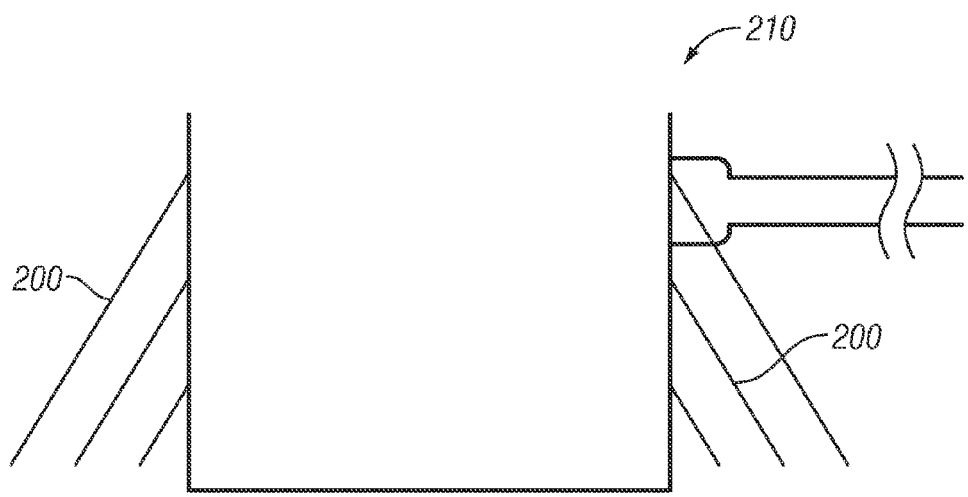
FIGS. 15A and B are drawings which respectively illustrate a cut-away view and a perspective view of an embodiment of the present invention wherein a plurality of sloped fins are attached to the periphery of a cooking pot.
Figure 15B:
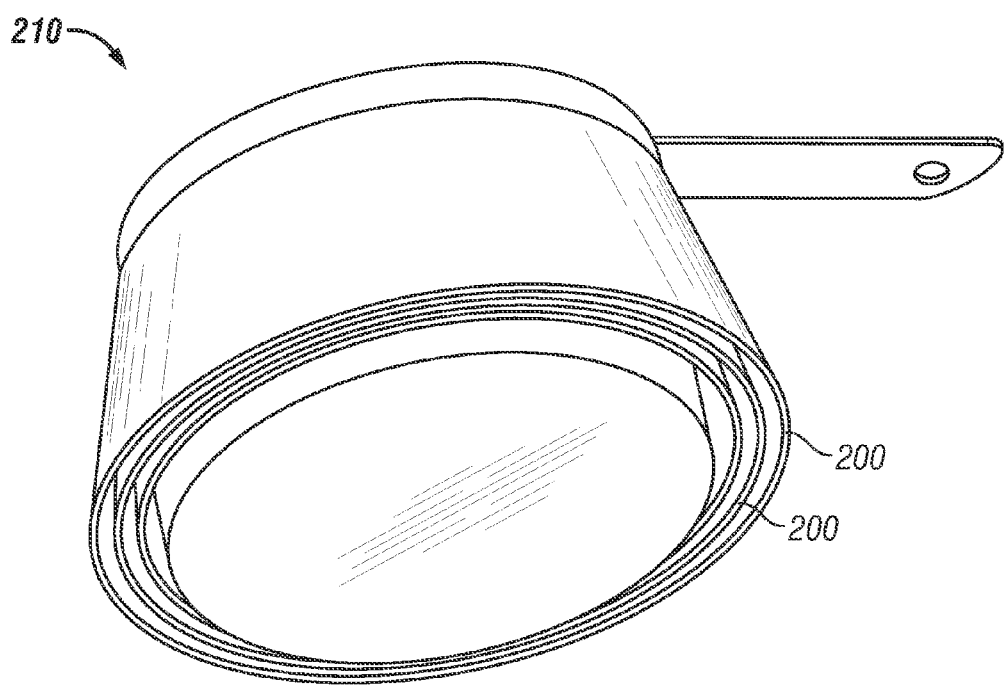

As with the foregoing fined embodiments, fins 200 can also be disposed about cooking pot 210, such as that illustrated in FIGS. 15A and 15B. As can be seen in the Figs., in this embodiment, fins 200 are preferably disposed at a non-vertical angle and are preferably disposed around cooking pot 210. Fins 200 cause the heated air, which would normally rise up beside a conventional cooking pot and provide little heating effect, to be trapped and held up against the side of pot 210, thus significantly increasing the efficiency of pot 210 by causing its sides to also become cooking surfaces instead of just the bottom surface of the pot as is the case with traditional cooking pots. In this embodiment, although one fin which slopes up to and is sealed against an outer circumference of the cooking pot can provide desirable results, more desirable results can be obtained with a plurality of such fins.

Figure 16A:
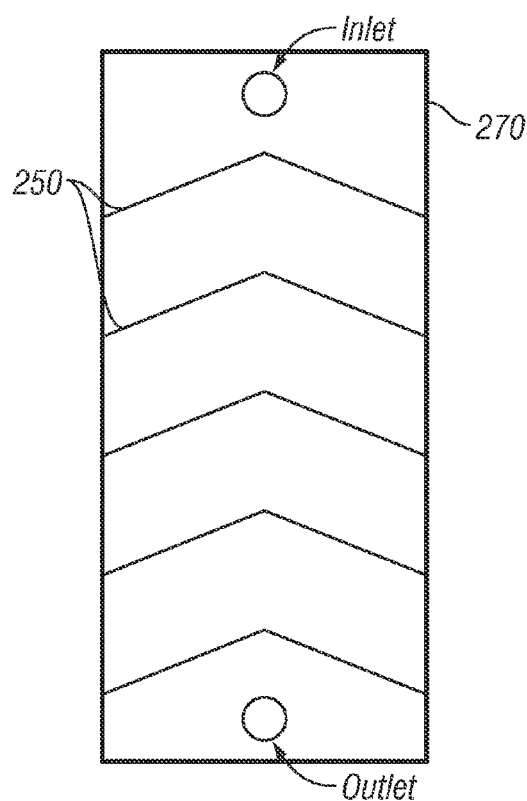
FIGS. 16A and B are drawings which respectively illustrate top and side-views of a two chamber heating stove comprising a plurality of internal fins.
Figure 16B:
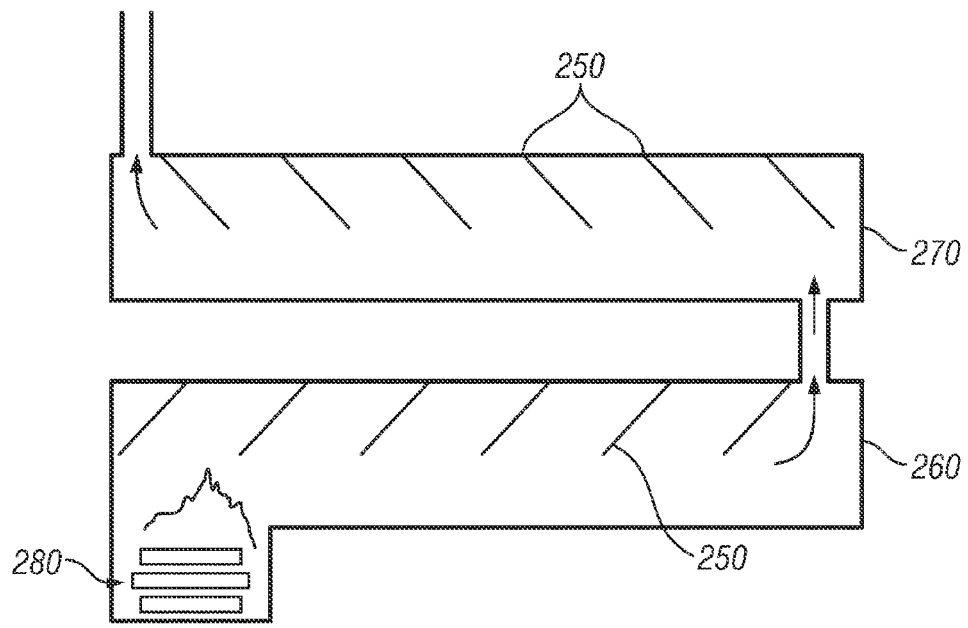

FIGS. 16A and 16B are drawings which illustrate a two chamber heating vessel according to an embodiment of the present invention. As can be seen, a plurality of fins 250 are preferably disposed in a v-shaped pattern within first and second chambers 260 and 270 such that the heated air created from a fire in firebox 280 is trapped within the fins and forced against the top and sides of the heating vessel. In this embodiment, the v-shaped patterns of the fins are not essential and desirable results can still be achieved with straight fins or with fins arranged in another pattern. It is most preferable that fins 250 are sealed at the top edge to the roof of chamber in which they are disposed, as well as their ends being sealed to the sides of their respective chambers, thereby causing the heated air to be trapped within the confines formed thereby and causing the heated air to cool through conduction to the firebox. However, in another embodiment, fins 250 can have one or more openings at the upper portion thereof, for example a hole disposed through one or more of fins 250 or one or more small gaps between one or more fins 250 and the chamber that it is disposed in. Optionally, one or more openings can also be disposed at the end portion of one or more fins 250 and/or between one or more ends of one or more fins and the unit within which fins 250 are disposed.

Figure 17:
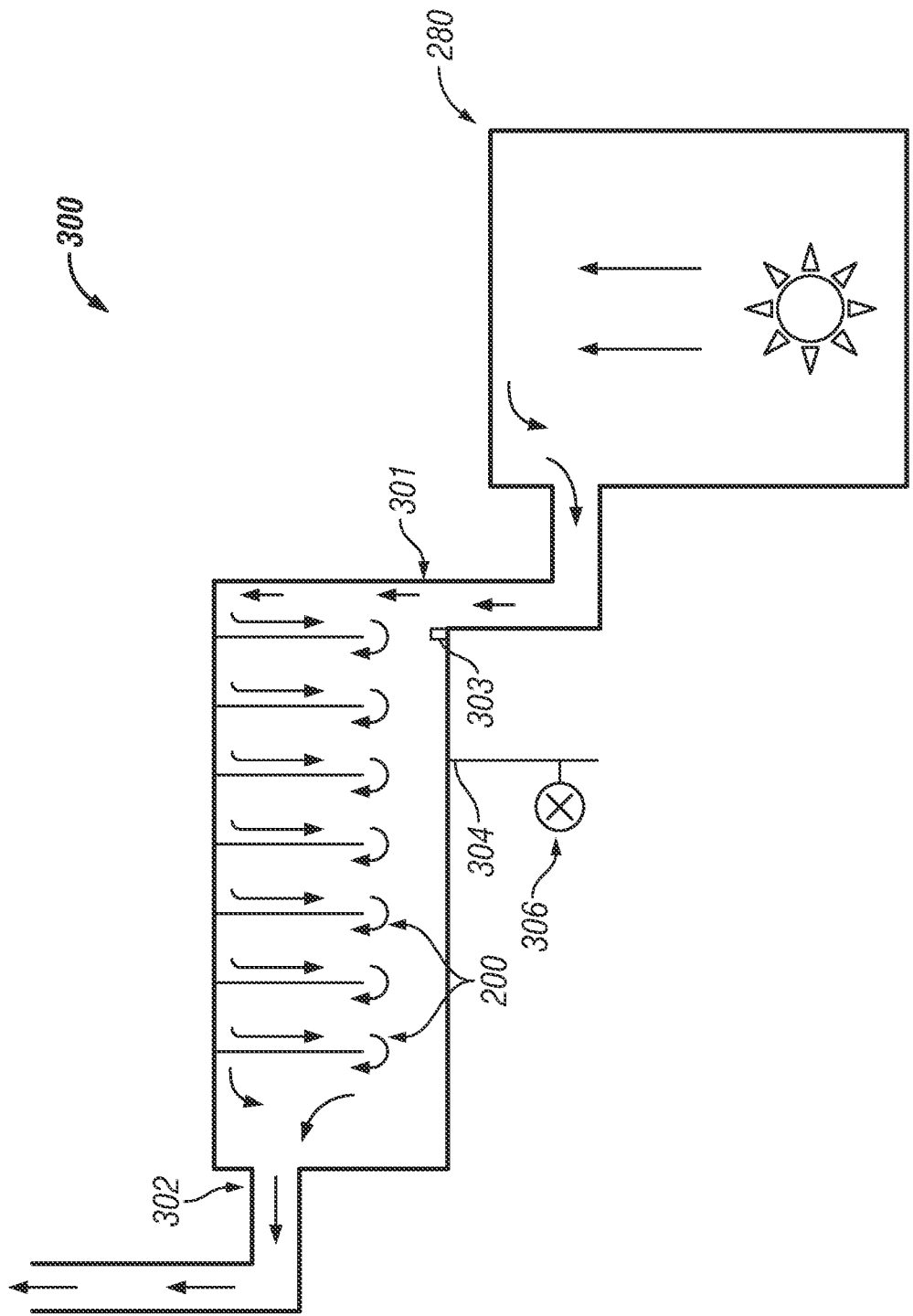
FIG. 17 is a drawing which illustrates an embodiment of the present invention wherein a fin-containing chamber is provided and contains a water collection mechanism.

As illustrated in FIG. 17, an embodiment of the present invention can include firebox 280 in fluid communication with a fin-containing second chamber 300 wherein a plurality of fins 200 are disposed. Optionally, the fluid communication between firebox 280 and fin-containing second chamber 300 can be provided via hot air inlet 301. Hot air can exit from fin-containing second chamber 300 via exhaust outlet 302. In this embodiment, dam-like structure 303 is preferably provided such that water which condenses from cooling gasses of combustion can be prevented from flowing down into firebox 280. Other configurations of second chamber 300 can be provided in lieu of dam-like structure 303. For example, a bottom of second chamber 300 can be sloped away from firebox 280 such that condensate which is formed flows away from firebox 280. Water removal outlet 304 is optionally provided and can be connected to valve 306, such that water which is condensed from gases of combustion can flow out of fin-containing second chamber 300. Optionally, the water which is removed from second chamber 300 can be re-directed back into firebox 280, or a portion thereof (for example an evaporative vessel) such that the water which is condensed can be used in a cooking process—for example as a natural smoke flavoring. In one embodiment, fin-containing second chamber 300, with fins 200 can be provided as an individual unit which can be attached to an outlet of an existing firebox, such that a user can increase the efficiency of an existing firebox.

In one embodiment, the distance between fins 200 and a bottom of fin-containing second chamber 300 is less than 12 inches, more preferably less than 6 inches, and most preferably less than 2 inches. In one embodiment, each of fins 200 are separate components and are not formed from a bend in a material which forms a top of firebox 280 or second chamber 300. In one embodiment, each of fins 200 are individually-attached components. Optionally, one or more cooking racks can be provided in firebox 280.

FIGS. 18A and B illustrate an embodiment of components that can be used to form a fin-containing chamber. As illustrated therein, top plate 400 (note that it is inverted in this figure to better illustrate the various components) preferably has a plurality of substantially vertically descending fins 402-412 arranged in a plurality of rows. In this embodiment, proximate fin 402 is preferably disposed closest to hot air inlet 420 and optionally has a short length, which acts to split incoming hot air into left and right flow streams. Optionally, fins 402-412 can be substantially the same length as the inside dimensions of fin-containing chamber housing 422, such that little to no air can pass between the ends of the fins and the sides of housing 422. Optionally, fins 402-412 can become progressively longer at each proceeding fin. Outlet 424 is preferably disposed at an end of housing 422 which is opposite from the end where inlet 420 is disposed. Accordingly, hot air enters into the fin-containing chamber via hot air inlet 420. It then rises up and attempts to flow to outlet 424, but encounters first fin 402 and is diverted into left and right flowing streams. The hot air streams are still super-heated from a firebox or other heat-generating source and thus remain at the top portion of fin-containing chamber, and thus build up as they encounter second fin 404. Without any fins in the way, the super-heated air would typically just race to outlet 424, thus wasting the heat energy of the hot air. As the hot air cools, it descends and thus overcomes fin 404, but rises again and is thus stopped again by third fin 406. The process continues at each subsequent fin. As the process continues, the hot air continues to conduct its heat energy into top plate 400, which conducts the heat to a usable environment.

In one embodiment, the firebox is not directly below all of the fins. In this embodiment, heated air must rise up from the heat-generating mechanism and then travel laterally to encounter all of the fins. In one embodiment, less than half of the fins are directly above the firebox. Optionally, none of the fins are directly above the firebox.

In one embodiment, at least ½ of the fins are flat and not curved. Optionally, all of the fins are flat and not curved. Preferably at least one of the fins is flat and not curved. In one embodiment, when in operation, at least one, at least half and/or all of the fins reside in a vertical orientation, a substantially vertical orientation, and/or an orientation comprising an angle of between about 45 degrees and about 90 degrees. In the embodiment wherein one or more fins comprise an angle of between about 45 to about 90 degrees, the fins more preferably comprise an angle of between greater than about 60 degrees and about 90 degrees. In one embodiment, the fins are all substantially the same angle as one another. In one embodiment, all of the fins are slanted in substantially the same direction. Optionally, the fins are all attached along the length of their top surface. In one embodiment, fins can be added into an exhaust stream of a water heater to increase the transfer of heat to the water.

In one embodiment, the fins are arranged such that none of the hot air from the firebox can rise straight up and exit without encountering at least one fin, and more preferably without encountering a plurality of fins. In one embodiment, the fins are preferably arranged such that all of the hot air that rises up from the firebox must encounter at least one fin and the hot air must then descend before being permitted to rise up and exit through a chimney or other outlet. In one embodiment, the fins are preferably arranged such that all of the rising hot air is required to descend before being permitted to escape through a chimney or other outlet. Optionally, the fins are arranged such that none of the rising hot air can exit out through a chimney or other outlet without encountering at least one fin. In one embodiment, the fins are fixed and are not adjustable. Optionally, however, the fins can be adjustably positioned. In one embodiment, the hot air from the firebox is not ignited after encountering at least one fin.

An embodiment of the present invention provides fins which direct hot air from a firebox to rise up against a side and or top of a chamber, shell, or other similar structure such that heat from the hot gas is caused to be transferred outside of the unit through a side and/or top plate and not through a chimney or other similar outlet, which would not improve efficiency of a unit. In one embodiment, a chimney is not disposed in a manner such that heat captured from one or more fins is caused to heat air outside of fin-containing chamber, which air is then permitted to rise directly up and out of a chimney—i.e. in one embodiment, the chimney is not positioned to transport away the bulk of air that is heated from hot air trapped by one or more fins.

In one embodiment, one or more fins reduce the temperature of exhaust that exits through a chimney or other outlet. In one embodiment, one or more fins reduce the temperature of exhaust that exits through a chimney or other outlet to a temperature less than the boiling point of water, such that condensation is formed.

INDUSTRIAL APPLICABILITY

The invention is further illustrated by the following non-limiting examples.

Example

A Home Comfort 1930 wood stove was retrofitted with fins in accordance with the teachings of an embodiment of the present invention. Internal and external temperatures were taken; Table 1 illustrates that the external temperature does not increase as much as the internal temperature.

TABLE 1

| Elapsed Time (min) | Internal Temperature (° F.) | External Temperature (° F.) | Notes |
| --- | --- | --- | --- |
| Start | 77 | 75 | Fire created by igniting 3 small sticks of wood |
| 11 | 206 | 98 | |
| 20 | 273 | 114 | 3 small sticks of wood added |
| 30 | 323 | 131 | |
| 40 | 383 | 144 | |
| 44 | 400+ | 149 | |
| 57 | 370 | 161 | Opened door to drop internal temperature |

The preceding example can be repeated with similar success by substituting the generically or specifically described components and/or operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus comprising:
a firebox;
a fin-containing compartment;
a plurality of fins, said fins depending downwardly from a roof of said fin-containing compartment at an angle of at least 45 degrees with respect to a horizontal axis, said fins disposed within said fin-containing compartment, said fins arranged such that hot air from said firebox rises up between said fins and transfers at least some of its heat energy to said fin-containing compartment, said fin-containing compartment heating via conduction a usable environment; and
a water removal outlet disposed in said fin-containing compartment.

2. The apparatus of claim 1 further comprising an exhaust outlet.

3. The apparatus of claim 2 wherein said fins and said exhaust outlet are positioned such that hot air which rises up between said fins must descend below at least one of said fins in order to exit through said exhaust outlet.

4. The apparatus of claim 1 wherein no openings are provided along a top portion of said fins.

5. The apparatus of claim 1 wherein said fins depend downwardly from said roof of said fin-containing compartment at an angle of at least 60 degrees with respect to a horizontal axis.

6. The apparatus of claim 1 wherein fins depend at least substantially vertically downwardly from said roof of said fin-containing compartment.

7. The apparatus of claim 1 wherein said fins depend downwardly from said roof of said fin-containing compartment to less than two inches above a bottom of said fin-containing compartment.

8. An apparatus comprising:
 a fin-containing compartment comprising a bottom, a top and a plurality of sides, an exterior of said fin-containing compartment in fluid communication with a cooking chamber;
 a hot air entrance disposed within said fin-containing compartment;
 an exhaust outlet disposed within said fin-containing compartment;
 a plurality of fins arranged within said fin-containing compartment;
 said fins depending downwardly from a roof of said fin-containing compartment; and
 each of said fins extending downwardly to less than six inches above said bottom of said fin-containing compartment.

9. The apparatus of claim 8 wherein said fins depend at least substantially vertically downward from said roof of said fin-containing compartment.

10. The apparatus of claim 8 wherein said fin-containing compartment is formed at least partially from a thermally-conductive material.

11. The apparatus of claim 8 wherein said fins are arranged such that hot air from said hot air entrance rises up between them.

12. The apparatus of claim 11 wherein said exhaust outlet is disposed such that hot air must descend under at least one of said fins in order to pass therethrough.

13. The apparatus of claim 8 wherein said cooking chamber is formed at least substantially from said fin-containing compartment.

14. The apparatus of claim 8 wherein each of said fins extends downwardly to less than two inches above said bottom of said fin-containing compartment.

15. The apparatus of claim 8 further comprising a water removal outlet on said fin-containing compartment.

16. An apparatus comprising:
 a fin-containing compartment comprising a bottom, a top and a plurality of sides, an exterior of said fin-containing compartment in fluid communication with a usable environment;
 a hot air entrance disposed within said fin-containing compartment;
 an exhaust outlet disposed within said fin-containing compartment;
 a plurality of fins arranged within said fin-containing compartment;
 a water-removal outlet on said fin-containing compartment;
 said fins depending downwardly from a roof of said fin-containing compartment; and
 each of said fins extending downwardly to less than six inches above said bottom of said fin-containing compartment.

17. The apparatus of claim 16 wherein said fins depend at least substantially vertically downward from said roof of said fin-containing compartment.

18. The apparatus of claim 16 wherein said fin-containing compartment is formed at least partially from a thermally-conductive material.

19. The apparatus of claim 16 wherein said fins are arranged such that hot air from said hot air entrance rises up between them.

20. The apparatus of claim 19 wherein said exhaust outlet is disposed such that hot air must descend under at least one of said fins in order to pass therethrough.

21. The apparatus of claim 16 wherein each of said fins extends downwardly to less than two inches above said bottom of said fin-containing compartment.

22. The apparatus of claim 16 wherein said usable environment comprises a living space.

* * * * *